(12) United States Patent
Waddington et al.

(10) Patent No.: US 8,868,849 B2
(45) Date of Patent: Oct. 21, 2014

(54) COUPLED LOCK ALLOCATION AND LOOKUP FOR SHARED DATA SYNCHRONIZATION IN SYMMETRIC MULTITHREADING ENVIRONMENTS

(75) Inventors: Daniel Waddington, Morgan Hill, CA (US); Tongping Liu, Amherst, MA (US); Chen Tian, Fremond, CA (US)

(73) Assignee: Samsung Electronics Co., Ltd., Suwon-Si (KR)

( * ) Notice: Subject to any disclaimer, the term of this patent is extended or adjusted under 35 U.S.C. 154(b) by 233 days.

(21) Appl. No.: 13/408,263

(22) Filed: Feb. 29, 2012

(65) Prior Publication Data

US 2013/0046939 A1 Feb. 21, 2013

Related U.S. Application Data

(60) Provisional application No. 61/524,677, filed on Aug. 17, 2011.

(51) Int. Cl.
*G06F 12/14* (2006.01)
*G06F 9/52* (2006.01)
*G06F 9/54* (2006.01)

(52) U.S. Cl.
CPC .............. *G06F 9/526* (2013.01); *G06F 9/544* (2013.01)

USPC .................... 711/147; 711/152; 711/E12.094

(58) Field of Classification Search
USPC .................................. 711/147, 152, E12.094
See application file for complete search history.

(56) References Cited

U.S. PATENT DOCUMENTS

2012/0151155 A1\* 6/2012 Chakrabarti et al. ......... 711/152

OTHER PUBLICATIONS

Greenhouse, Aaron "A Programmer-Oriented Approach to Safe Concurrency," May 2003, CMU-CS-03-135, http://reports-archive.adm.cs.cmu.edu/anon/2003/CMU-CS-03-135.pdf, 237 pages.

\* cited by examiner

*Primary Examiner* — Yong Choe
(74) *Attorney, Agent, or Firm* — Kenneth L. Sherman, Esq.; Michael Zarrabian, Esq.; Sherman & Zarrabian LLP (57) ABSTRACT

In a shared memory process different threads may attempt to access a shared data variable in a shared memory. Locks are provided to synchronize access to shared data variables. Each lock is allocated to have a location in the shared memory relative to the instance of shared data that the lock protects. A lock may be allocated to be adjacent to the data that it protects. Lock resolution is facilitated because the memory location of a lock can be determined from an offset with respect to the data variable that is being protected by the lock.

20 Claims, 6 Drawing Sheets

Allocate each lock to be proximate to the data variable that the lock protects

405

For a memory access to a shared data variable, resolve the lock location by determining the offset with respect to the shared data variable

COUPLED LOCK ALLOCATION AND LOOKUP FOR SHARED DATA SYNCHRONIZATION IN SYMMETRIC MULTITHREADING ENVIRONMENTS

CROSS REFERENCE TO RELATED APPLICATIONS

The present application claims the benefit of U.S. Provisional Application 61/524,677, which was filed on Aug. 17, 2011, the contents of which are hereby incorporated by reference.

FIELD OF THE INVENTION

The present invention is generally directed to improvements in locks used for shared data synchronization in a shared memory process. More particularly the present invention is directed to improvements in techniques to allocate locks and improvements in lock resolution.

BACKGROUND OF THE INVENTION

Figure 1:
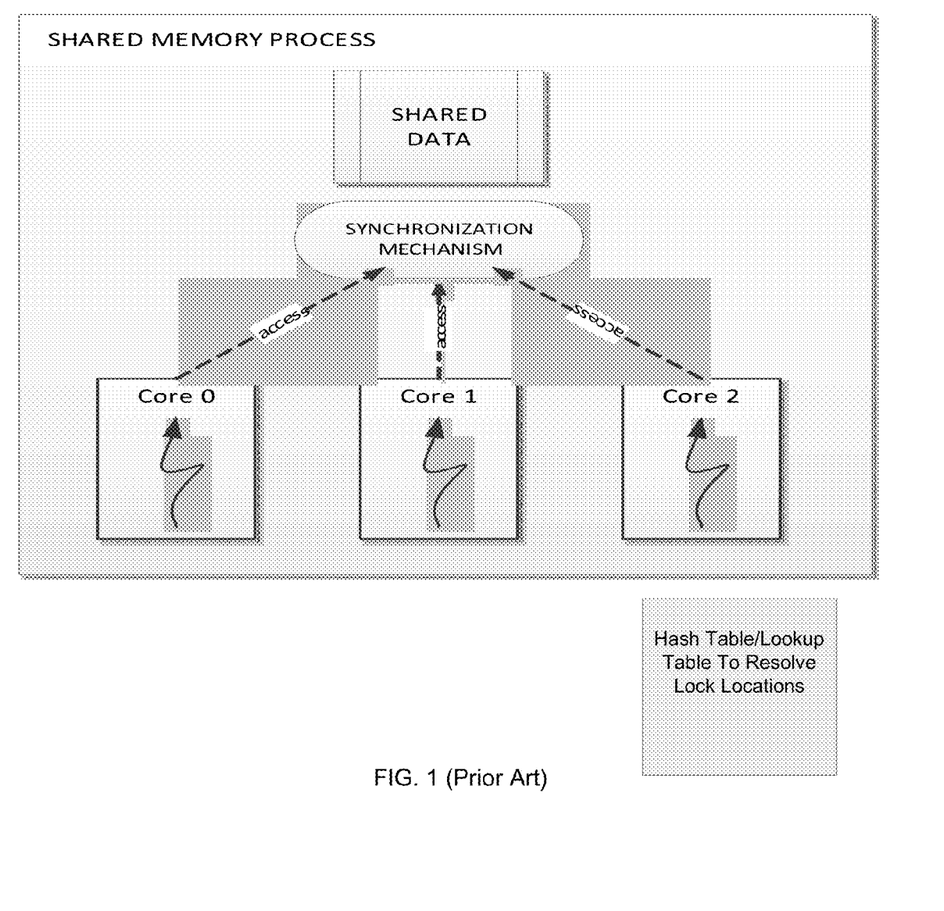
FIG. 1 illustrates a conventional shared memory process and hash tables used to resolve locks.

Software that is designed to run on multicore and manycore processors (also known as Chip Multiprocessors (CMP)) must be explicitly structured for correctness in the presence of concurrent execution. Most multicore processors today support a programming model of coherent shared memory whereby multiple threads, belonging to the same process, can access the same address space and data variables therein. Furthermore, different threads can execute concurrently on different cores on the same multicore processor. The underlying hardware is responsible for ensuring a consistent view of memory for each of the threads in the process. This hardware model is known as Symmetric Multi-Processing (SMP) and is commonplace in today's multicore machines FIG. 1 illustrates a conventional multicore processor system having a shared memory programming model that includes a synchronization mechanism to coordinate accesses from different threads to the same data location in order to give consistent and correct results. In the prior art a programmer would manually declare and associate a lock with each variable, which creates a potential source of error. Additionally, a hash table or other lookup table structure was typically required to resolve the relationship between locks and variables. In the traditional way to use locks, locks are predefined and it is not easy to use the "correct" lock because of the difficulties of tracking the relation between locks and variables. Moreover, the traditional way to use locks is error-prone (due to incorrect lock selection or failing to take or release the lock at the appropriate time) causing many kinds of errors such as: races, atomicity violations or deadlocks.

An important element of correctness within a shared memory environment is ensuring that accesses to data are serialized in order to ensure atomicity in data writes. For example, suppose that Thread A (running on core 0) is writing a 64-bit aligned integer (e.g., a variable 'v') in memory (on a 32-bit machine) such that two memory operations/transactions on the memory controller are needed for Thread A to complete the write. Without correct synchronization, a Thread B might read the first half of the memory location before Thread A has completed writing the second half—this would give an inconsistent and incorrect result. To avoid this problem, read and write access to variable 'v' should be synchronized through some form of concurrency mechanism (e.g., spinlock, mutex, or semaphore) that can be realized on a specific processor.

Synchronization mechanisms can be implemented as language-level constructs (e.g., Java®'s synchronized keyword) or as a call to a library (e.g., a POSIX pthread library). In both cases the programmer must explicitly identify the allocation of the locks. In addition to allocating the locks, the programmer must in general reference the locks through compile-time symbols.

Below is an example of typical lock protection in the C programming language:

```
#include <pthread.h>
...
int shared_data;
pthread_mutex_t shared_data_lock =
PTHREAD_MUTEX_INITIALIZER;
/* static lock initialization */
void func( )
{
    /* take lock */
    pthread_mutex_lock(&shared_data_lock);
    /* safe access data */
    shared_data ++;
    /* release lock */
    pthread_mutex_unlock(&shared_data_lock);
}
```

In this example of lock protection, there must be a known relationship between a lock and the corresponding piece of shared data that it is protecting (i.e., that the shared_data_lock protects shared_data). The only thing that assures that the correct locks are being taken for access to a given shared data variable is the diligence of the programmer.

Tracking lock-variable relationships is difficult for the programmer especially when locks have been declared separately from the point of variable access. There are some commercial products that allow the inclusion of code annotations to aid in the formal specification of relationships and thus allow machine-based verification of correct lock usage via static analysis. Nevertheless, this approach cannot be easily realized within the context of an off-the-shelf compiler such as GNU C/C++.

The present invention was developed in view of the above-described problems in the prior art in regards to lock and allocation and lock resolution.

SUMMARY OF THE INVENTION

The present invention includes an apparatus, system, method, and computer program product that is generally directed to a technique in a shared memory process for allocating locks for each instance of a shared resource in the shared memory by allocating locks to be proximate to the shared resource that the lock protects. A computing environment has two or more processors that attempt to access a shared memory. The shared resource may comprise an instance of program data variable but more generally it may also include other shared resources in memory, such as shared non-reentrant functions (i.e. program code).

The present invention enables efficient lock resolution (finding a lock that corresponds to a shared resource) because the memory address of the location of the lock can be inferred from the memory address of the shared resource that the lock is protecting. In one embodiment the lock is located adjacent to the shared resource. An offset from the memory location of the data variable may be used to locate the corresponding lock. In one implementation, lock structures are allocated directly adjacent to the data that they are protecting. The address of the data variable that is being accessed is all that is required to locate (and take) the appropriate lock without the need to use hash tables or similar lock resolution means.

DETAILED DESCRIPTION

Figure 2:
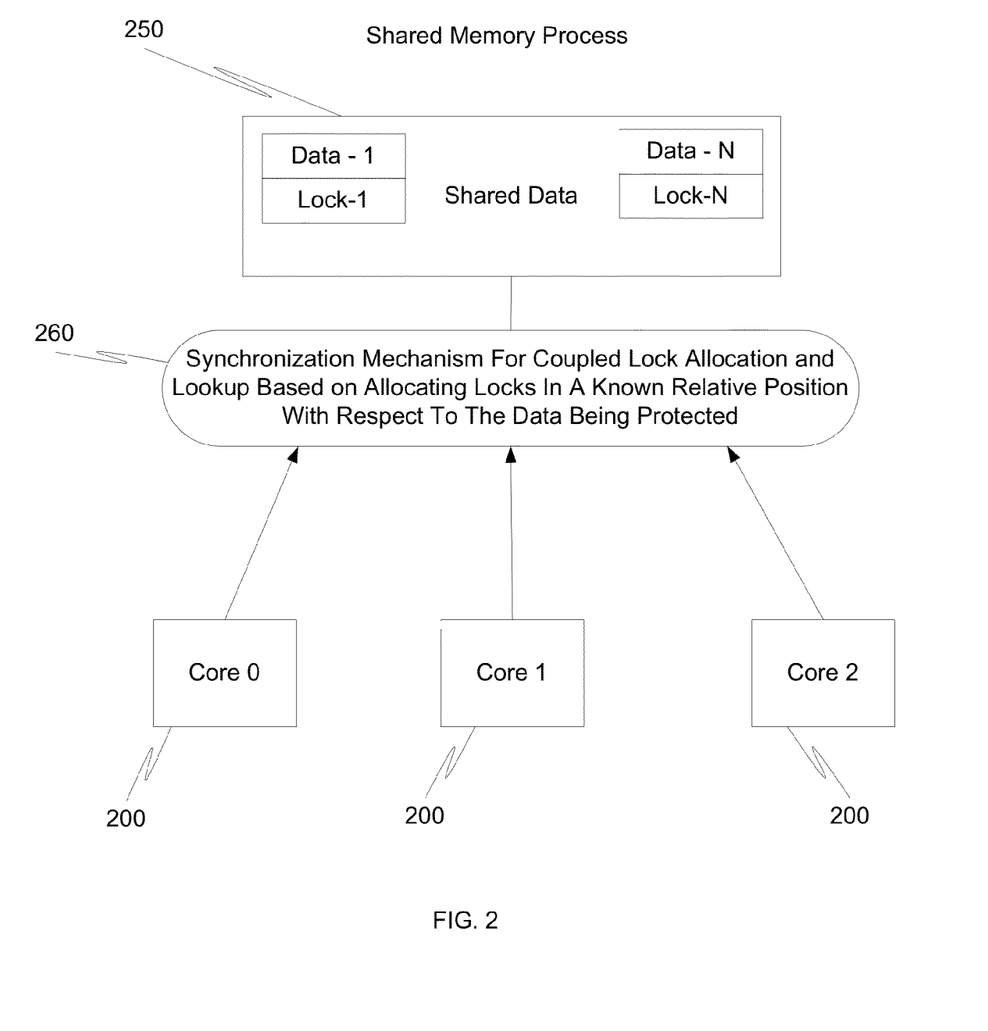
FIG. 2 is a block diagram of a system employing lock allocation and resolution in accordance with an embodiment of the present invention.

Referring to FIG. 2, a multicore processor system is illustrated that is configured for a shared memory process. In this example, threads from a plurality of individual cores 200 attempt to access a shared memory 250 in a Symmetric Multi-Threading environment. The system is configured to include a synchronization mechanism 260 based on allocating locks in a known position relative to a shared resource (e.g., a shared program data variable) that is being protected. For example, within the shared memory an individual instance of shared data may have a lock allocated adjacent to the shared data. Thus the lock corresponding to a specific instance of shared data may be located by determining an offset from the address of the corresponding variable.

The locks can be used in the same manner as conventional locks in terms of a sequence of locating a lock, taking a lock, accessing data, and then releasing a lock. However, the address of the variable that is being accessed is all that is required to locate (and take) the appropriate lock, thus eliminating the need for lookup tables or manual identification by the programmer at time of writing the program code.

Thus, this approach provides efficient "lock resolution" (i.e. location of a lock that corresponds to a specific instance of a data variable) without the need to use hash tables, a lookup table, or similar means would be necessary for compiler-based lock instrumentation or other tool based approaches. Additionally, an important differentiator for this approach is that it can be easily integrated into a compiler/automated methodology and thus eliminates potential programming errors associated with conventional manual methods of allocating locks.

One aspect of the present invention is that a lock data structure is allocated at a memory location that is referenced by a relative offset with respect to the memory location of the data variable that the lock is protecting. As one example, the lock data structure can be allocated adjacent to the data variable such as being located immediately after the data variable that the lock is protecting. In particular, in a preferred implementation the lock data structure is allocated at a memory location that is immediately after the data that the lock is protecting. Thus when an attempt is made to access a data variable the offset of the lock for that data variable may be easily determined.

Figure 3:
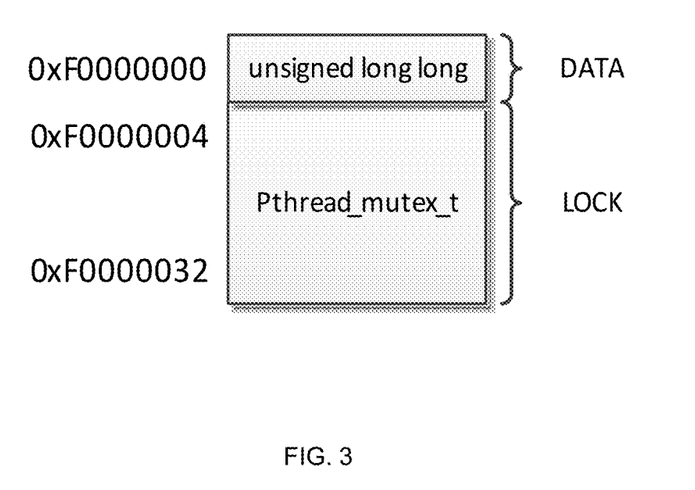
FIG. 3 illustrates allocation of a lock adjacent to the instance of shared data that the lock protects on a 32 bit OS.

Referring to the example of FIG. 3, data (a 4 byte long integer) is allocated at the shared memory address 0xF0000000, whilst the lock structure (pthread_mutex_t) is allocated at the shared memory address 0xF0000004-0xF0000032. In the example of FIG. 3 the lock location can be resolved based on the offset between the lock location and the data variable that the lock protects. In particular, in the example of FIG. 3 for an address of any variable 'v', irrespective of the type and length of 'v', then the address of the corresponding lock is inferred from the location of the data variable and its size as follows:

$$p\text{thread\_mutex\_}t = (p\text{thread\_mutex\_}t^*)(((\text{unsigned long})\&v) + \text{sizeof}(v)).$$

Figure 4:
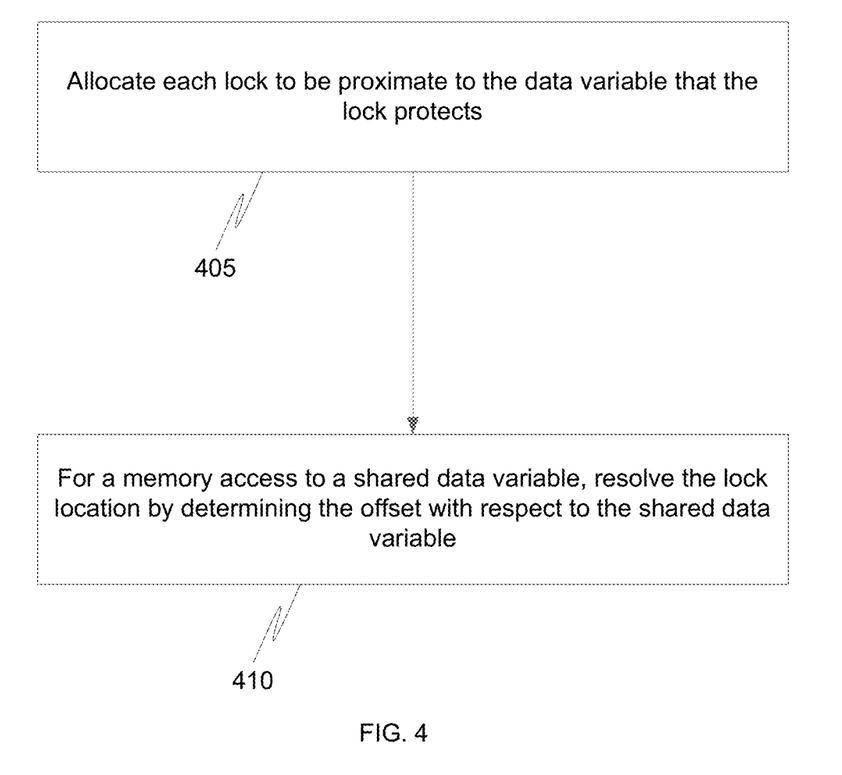
FIG. 4 is a flow chart of a method of allocating and resolving locks in accordance with embodiments of the present invention.

FIG. 4 illustrates an exemplary method. The locks are allocated in step 405 to be proximate the location of the data variable that a lock protects. In a memory access, a lock is resolved in step 410 by determining its offset with respect to the memory location of the data variable.

Figure 5A:
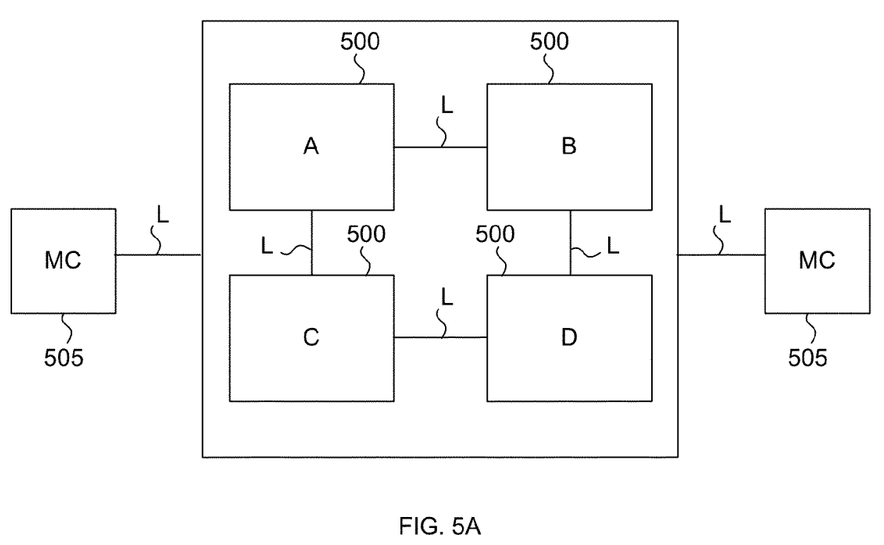
FIGS. 5A, 5B, and 5C illustrate additional examples of shared memory process environments for which the present invention may be applied.
Figure 5B:
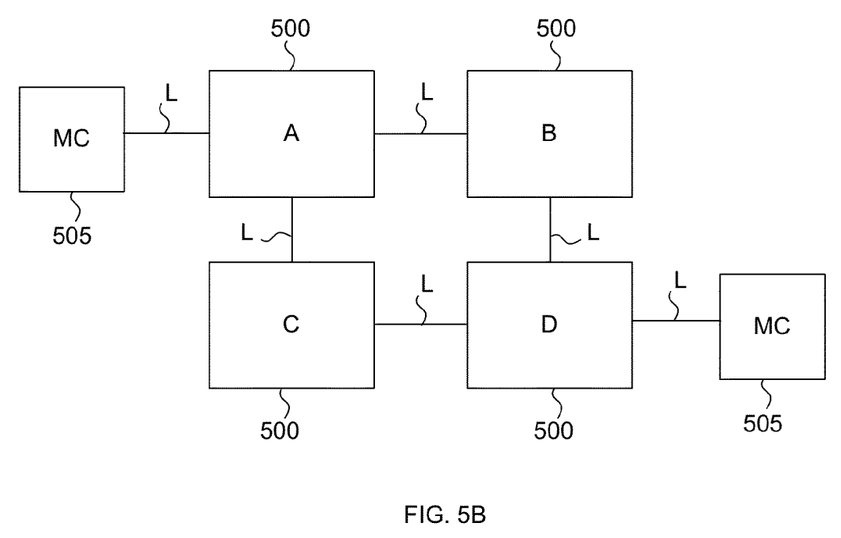
Figure 5C:
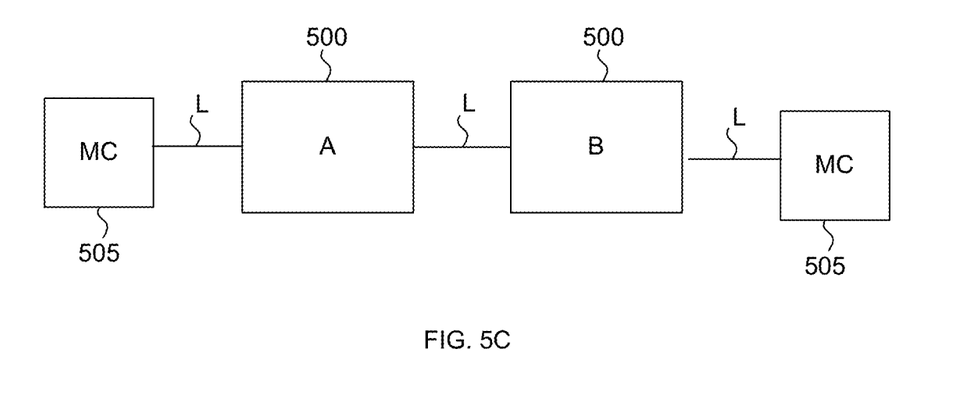

The lock allocation and lookup may be applied to a variety of different shared memory process configurations. Examples include multicore processors, NUMA architectures, or stripped multi-processors as illustrated in FIGS. 5A-5C. As illustrated in FIG. 5A, the present invention may be implemented in a multi-core processor having multiple cores 500 linked together with links, L, and memory controllers 505 for accessing shared memories. FIG. 5B illustrates a non-uniform memory access environment in which there are multiple processors 500 linked together and accessing shared memories via memory controllers 505. FIG. 5C illustrates a stripped multiprocessor implementation. Other variations in the numbers and arrangements of processors and/or processor cores known in the art for a shared memory process may also be used. The computer software for lock resolution may be stored on any suitable memory accessible to one of the processors attempting to make a memory access.

The synchronization function may be implemented on computer program code stored in memory and executed by one or more processors. While the lock allocation and lookup is suitable for shared program data variables more generally it may also be applied to shared (non-reentrant) functions.

A preferred implementation is based on the C/C++/C++11 programming languages. In the C++ programming language this lock resolution technique can be realized using the "variable reference" feature. The following code excerpt illustrates allocation and access of a pthread_mutex_t lock to protect the global variable unsigned long i. We use C macros to simplify the lock resolution as follows:

```
/* helper macros */
#define lock(X) pthread_mutex_lock((pthread_mutex_t *)((unsigned long)& X)+sizeof(X))
#define unlock(X) pthread_mutex_unlock((pthread_mutex_t *)((unsigned long)& X)+sizeof(X))
struct shared_long
{
    unsigned long ___data;
    pthread_mutex_t ___lock;
    ___data;
}
___attribute___((packed)); /* e.g., structure must be declared packed */
struct shared_long ___safe_x;
unsigned long& x = ___safe_x;
void myfunction( )
{
    lock(x);
    x++; /* access 'x' in the same way as we would access any other integer variable */
    unlock(x);
}
```

Note that the variables are being accessed and treated in the same way their lock-less counterparts. Thus the lock resolution is comparatively easy to implement and also computationally efficient compared to prior art approaches using hash tables or other lookup means.

The declaration of the lock and variable (i.e., in the above example this is the declaration and instantiation of shared_int) could also be reduced to C/C++ macros for ease of use. Alternatively, this might be used as part of a source-to-source high level compiler.

For the C programming language, which does not have reference types, the following use of an anonymous union can be used:

```
/* helper macros */
#define lock(X) pthread_mutex_lock((pthread_mutex_t *)((unsigned long)& X)+sizeof(X))
#define unlock(X) pthread_mutex_unlock((pthread_mutex_t *)((unsigned long)& X)+sizeof(X))
static union
{
    struct __dummy
    {
        unsigned long __data;
        pthread_mutex_t __lock;
    } __attribute__((packed)); /* e.g., structure must be declared packed */
    unsigned long y;
};
void myfunction( )
{
    lock(y);
    y++; /* access 'y' in the same way as we would access any other integer variable */
    unlock(y);
}
```

However, note that C compilers (e.g., GNU C) do not support non-static global anonymous unions and thus a global variable must be made static with this method.

The programmability is also an advantage in that the programmer who is accessing a variable 'x' does not need to know the corresponding symbolic name of the particular associated lock. There is no room for programmer error. The programmer does not need to explicitly define locks for protecting data because the programmer can use a type system, such as reference types. Additionally, embodiments of the present invention do not require any change in how the protected data type is used in the code.

An aspect of the present invention is that the lock allocation and lock resolution is scalable since there is no table or explicit look up required to find the lock corresponding to a specific variable instance. Thus, the scalability of the lock allocation and lock resolution approach of the present invention is attractive for multi-core and many core computing systems. Additionally, this aspect of the present invention is particularly valuable when there are a large number of locks which cannot be easily associated by the developer at the time of writing the program.

Moreover, the present invention also facilitates lock allocation and lock resolution for the case of arrays of locks for an array of variables. In the prior art, an associated offset may be associated with the corresponding lock (e.g., the lock for v[a] is lock[a]). This is fast and effective but relies on variable 'v' having an index 'a'. However, this prior art technique breaks down when variables are symbolically named, such as for variables v0 to v1000. In contrast, the lock allocation and lock resolution of the present invention remains effective when there are arrays of locks for an array of variables.

The present invention enables efficient lock resolution (i.e. locate the lock corresponding to a specific instance of data) without the use of a lookup table. The approach is especially valuable in the context of compiler-based (automated) lock instrumentation that transforms existing code in order to integrate lock allocation and lock acquisition for the purpose of enforcing serialized access to shared data. Calculations indicate that the time to locate a lock in a multicore environment is reduced by x70 fold (compared to a hash table). Additionally, manual methods are error prone and cannot be integrated into a compiler/automated methodology. The present invention is valuable to lock resolution since it maximizes performance of lock acquisition in a scalable way.

The present invention provides the benefit of a centralized way to manage locks. The coupling mechanism of the present invention can also help to improve performance for a variety of reasons. First an aspect of the present invention is that it some cases it is possible that locks and shared variables are sharing the same cache, which improves performance. In contrast in the prior art the lock could be far away from the actual data and thus requiring the loading of two different cache lines into the cache when attempting to access the shared data.

While exemplary implementations in the C/C++ programming languages have been described, it will be understood that the approach may be applied with other programming languages that have the capability to manage location of variables and lock positions in a shared memory. Moreover it will be understood that the concept of using a lock and a data variable in proximity in memory could be extended to a hardware implementation.

While examples of the present invention have been described in regards to a shared memory process in a multi-core processor environment, it will be understood that the present invention may be used with other processor architectures. As an example, the present invention may also be used in a shared memory process utilizing time-multiplexing on a uniprocessor.

While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims. The present invention may be practiced without some or all of these specific details. In addition, well known features may not have been described in detail to avoid unnecessarily obscuring the invention.

In accordance with the present invention, the components, process steps, and/or data structures may be implemented using various types of operating systems, programming languages, computing platforms, computer programs, and/or general purpose machines. In addition, those of ordinary skill in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein. The present invention may also be tangibly embodied as a set of computer instructions stored on a computer readable medium, such as a memory device. For example, the individual computer code to resolve locks may reside on a non-transitory storage medium, such as a memories and be executed by individual processors within the shared memory process. The computer code for aiding in automation of lock allocation (in a complier/automation implementation) may reside on a non-transitory storage medium.

The various aspects, features, embodiments or implementations of the invention described above can be used alone or in various combinations. The many features and advantages of the present invention are apparent from the written description and, thus, it is intended by the appended claims to cover all such features and advantages of the invention. Further, since numerous modifications and changes will readily occur to those skilled in the art, the invention should not be limited to the exact construction and operation as illustrated and described. Hence, all suitable modifications and equivalents may be resorted to as falling within the scope of the invention.

What is claimed is:

1. A method of using locks in a multithreaded computing system having at least two processors and a shared memory process configuration, comprising:
   for each instance of shared data in at least a portion of a shared memory, allocating a lock in the shared memory;
   wherein each allocated lock has a corresponding lock location, and wherein the lock location is based on an offset for the lock relative to a memory location of the instance of shared data protected by the lock.

2. The method of claim 1, wherein:
   each lock location of each allocated lock is a memory location that is proximate to a memory location of the instance of shared data protected by the lock; and
   each allocated lock is allocated to be adjacent to the instance of shared data protected by the lock.

3. The method of claim 1, further comprising:
   resolving a lock location for a lock protecting a particular instance of shared data in the shared memory based on a memory location of the particular instance of shared data and an offset relative to the memory location, wherein the lock location is the memory location adjusted by the offset.

4. The method of claim 1, wherein a particular instance of shared data is allocated together with a corresponding lock.

5. The method of claim 1, wherein each allocated lock is automatically allocated by a compiler.

6. The method of claim 1, wherein each allocated lock is implicitly defined with respect to the data it protects via a type system, such that a programmer does not have to explicitly define locks.

7. The method of claim 1, wherein each lock location of each allocated lock is based on an offset for the lock relative to a memory location of the instance of shared data protected by the lock, wherein the offset is based on a size of the instance of shared data protected by the lock.

8. A multithreaded computing system comprising:
   at least two processors in a shared memory process configuration in which threads of the at least two processors access a shared memory, wherein accesses to shared data in the shared memory are synchronized, via lock allocation, for individual instances of shared data;
   wherein each allocated lock has a corresponding lock location, and wherein the lock location is based on an offset for the lock relative to a memory location of the instance of shared data protected by the lock.

9. The system of claim 8, wherein:
   each lock location of each allocated lock is a memory location that is proximate to a memory location of the instance of shared data protected by the lock; and
   each allocated lock is allocated to be adjacent to the instance of shared data protected by the lock.

10. The system of claim 8, wherein:
    a lock location for a lock protecting a particular instance of shared data in the shared memory is resolved based on a memory location of the particular instance of shared data and an offset relative to the memory location, wherein the lock location is the memory location adjusted by the offset.

11. The system of claim 8, wherein a particular instance of shared data is allocated together with a corresponding lock.

12. The system of claim 8, wherein each allocated lock is automatically allocated by a compiler.

13. The system of claim 8, wherein each allocated lock is implicitly defined with respect to the data it protects via a type system, such that a programmer does not have to explicitly define locks.

14. A method of resolving locks in a multithreaded computing system having at least two processors and a shared memory process configuration, comprising:
    for each access to an instance of shared data in at least a portion of a shared memory, determining a memory location of a lock based on an offset for the lock relative to a memory location of the instance of shared data protected by the lock.

15. The method of claim 14, wherein:
    each lock location of each allocated lock is a memory location that is proximate to a memory location of the instance of shared data protected by the lock; and
    each allocated lock is allocated to be adjacent to the instance of shared data protected by the lock.

16. The method of claim 15, further comprising:
    resolving a lock location for a lock protecting a particular instance of shared data in the shared memory based on a memory location of the particular instance of shared data and an offset relative to the memory location, wherein the lock location is the memory location adjusted by the offset.

17. A multithreaded computing system comprising:
    at least two processors in a shared memory process configuration in which threads of the at least two processors access a shared memory, wherein lock resolution for a lock protecting an instance of shared data in the shared memory is determined based on an offset for the lock relative to a memory location of the instance of shared data.

18. The system of claim 17, wherein:
    each lock location of each allocated lock is a memory location that is proximate to a memory location of the instance of shared data protected by the lock; and
    each allocated lock is allocated to be adjacent to the instance of shared data protected by the lock.

19. The system of claim 17, wherein lock resolution for a lock protecting a particular instance of shared data in the shared memory is resolved based on a memory location of the particular instance of shared data and an offset relative to the memory location, wherein the lock has a memory location that is the memory location of the particular instance of shared data adjusted by the offset.

20. A non-transitory computer readable storage medium comprising computer readable instruction which when executed by a processor implement a method comprising:
    for each access to an instance of shared data in at least a portion of a shared memory, determining a memory location of a lock based on an offset for the lock relative to a memory location of the instance of shared data protected by the lock.

* * * * *